(12) United States Patent
Chi et al.

(10) Patent No.: US 9,191,319 B2
(45) Date of Patent: Nov. 17, 2015

(54) PACKET TRANSMISSION SYSTEM, METHOD AND NON-TRANSITORY COMPUTER READABLE STORAGE MEDIUM OF THE SAME

(71) Applicant: INSTITUTE FOR INFORMATION INDUSTRY, Taipei (TW)

(72) Inventors: Po-Wen Chi, Taipei (TW); Yu-Hsiang Lin, New Taipei (TW); Jing-Wei Guo, Tainan (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 115 days.

(21) Appl. No.: 14/109,943

(22) Filed: Dec. 17, 2013

(65) Prior Publication Data
US 2015/0163138 A1 Jun. 11, 2015

(30) Foreign Application Priority Data
Dec. 10, 2013 (CN) .......................... 2013 1 0683940

(51) Int. Cl.
| | | |
|---|---|---|
| *H04L 12/28* | (2006.01) | |
| *H04L 12/741* | (2013.01) | |
| *H04L 12/721* | (2013.01) | |
| *H04Q 11/00* | (2006.01) | |

(52) U.S. Cl.
CPC .............. *H04L 45/745* (2013.01); *H04L 45/38* (2013.01); *H04Q 11/00* (2013.01)

(58) Field of Classification Search
CPC .................. H04L 25/03853; H04L 25/03859; H04L 29/08738; H04L 29/12462; H04L 45/021; H04L 45/38; H04L 45/54; H04L 45/70; H04L 67/2814
USPC ................................. 370/351–356, 389–392
See application file for complete search history.

(56) References Cited

U.S. PATENT DOCUMENTS

| | | | |
|---|---|---|---|
| 8,478,707 B1 | 7/2013 | Ong et al. | |
| 2012/0201140 A1 | 8/2012 | Suzuki et al. | |
| 2014/0006549 A1* | 1/2014 | Narayanaswamy et al. .. | 709/217 |
| 2014/0269691 A1* | 9/2014 | Xue et al. ...................... | 370/389 |
| 2015/0023154 A1* | 1/2015 | Parisien et al. ............... | 370/225 |

* cited by examiner

*Primary Examiner* — Kan Yuen
(74) *Attorney, Agent, or Firm* — CKC & Partners Co., Ltd.

(57) ABSTRACT

A packet transmission system is provided that includes packet switching modules each having a memory unit to store packet flow tables and a control module coupled to the packet switching modules. The control module includes a memory to store computer executable commands and a processor. The process executes the commands to perform the operations outlined below. A flow entry corresponding to a target packet switching module is generated. A residual memory amount of the memory unit of the target packet switching module is determined to be lower than a threshold value. A redirection packet switching module is selected from the other packet switching modules. A redirection flow entry is added to the packet flow tables in the target packet switching module and a processing flow entry is added to the packet flow tables in the redirection packet switching module according to the flow entry.

19 Claims, 6 Drawing Sheets

PACKET TRANSMISSION SYSTEM, METHOD AND NON-TRANSITORY COMPUTER READABLE STORAGE MEDIUM OF THE SAME

RELATED APPLICATIONS

This application claims priority to China Application Serial Number 201310683940.0 filed Dec. 10, 2013, which is herein incorporated by reference.

BACKGROUND

1. Field of Invention

The present invention relates to packet transmission technology. More particularly, the present invention relates to a packet transmission system, method and non-transitory computer readable storage medium of the same.

2. Description of Related Art

With the increasing complexity of network environments, traditional network switches and routers need to have more and more functions, leading to low network transmission efficiency. In addition, with the limitations encountered due to the operating system of network hardware equipment, administrators are not allowed to freely manage the transmission paths of the network packets based on requirements. In response, Stanford University of the United States started to promote experimental technology referred to as "OpenFlow" in 2008 with the expectation that the open network management architecture would improve network efficiency and satisfy the demand for flexible applications so as to ultimately provide more accurate network management abilities to network service providers.

OpenFlow technology separates the functions of network path control and data packet transmission that are both performed by network switches or routers using conventional technology. The function of network path control is performed by an additional control server installed with Open-Flow control software. The control server controls the Open-Flow switch by managing the matching criteria and the corresponding actions included in a flow table. The Open-Flow switch performs the function of data packet transmission according to a rule in which when a packet matches a criteria in the flow table, a corresponding action is performed.

However, the storage amount of the memory unit in the OpenFlow switch is limited. When the user adds too many entries in the flow tables in order to increase the efficiency of the switch, the memory may not be able to store all the entries.

Accordingly, what is needed is a packet transmission system, method and non-transitory computer readable storage medium of the same to address the issues mentioned above.

SUMMARY

An aspect of the present invention is to provide a packet transmission system. The packet transmission system includes a plurality of packet switching modules and a control module. Each of the packet switching modules has a memory unit to store a plurality of packet flow tables. The control module is coupled to the packet switching modules to update the plurality of packet flow tables. The control module includes a memory to store a plurality of computer executable commands and a processor. The processor executes the commands to perform operations outlined below. A flow entry corresponding to a target packet switching module of the plurality of packet switching modules is generated. A residual memory amount of the memory unit of the target packet switching module is determined to be lower than a threshold value. A redirection packet switching module is selected from the other packet switching modules, wherein the residual memory amount of the memory unit of the redirection packet switching module is not lower than the threshold value. A redirection flow entry is added to the packet flow tables in the target packet switching module and a processing flow entry is added to the packet flow tables in the redirection packet switching module according to the flow entry. When the target packet switching module receives a packet corresponding to the redirection flow entry, the target packet switching module redirects the packet to the redirection packet switching module according to the redirection flow entry such that the redirection packet switching module processes the packet according to the processing flow entry.

Another aspect of the present invention is to provide a packet transmission method used in a packet transmission system. The packet transmission system includes a plurality of packet switching modules and a control module. Each of the packet switching modules has a memory unit to store a plurality of packet flow tables, and the control module is coupled to the packet switching modules to update the plurality of packet flow tables, wherein the control module includes a memory to store a plurality of computer executable commands and a processor. The packet transmission method includes the steps outlined below. A flow entry corresponding to a target packet switching module of the plurality of packet switching modules is generated. A residual memory amount of the memory unit of the target packet switching module is determined to be lower than a threshold value. A redirection packet switching module is selected from the other packet switching modules, wherein the residual memory amount of the memory unit of the redirection packet switching module is not lower than the threshold value. A redirection flow entry is added to the packet flow tables in the target packet switching module and a processing flow entry is added to the packet flow tables in the redirection packet switching module according to the flow entry. The packet is redirected to the redirection packet switching module by the target packet switching module according to the redirection flow entry when the target packet switching module receives a packet corresponding to the redirection flow entry. The packet is processed according to the processing flow entry by the redirection packet switching module.

Yet another aspect of the present invention is to provide a non-transitory computer readable storage medium to store a computer program to execute a packet transmission method used in a packet transmission system. The packet transmission system includes a plurality of packet switching modules and a control module. Each of the packet switching modules has a memory unit to store a plurality of packet flow tables, and the control module is coupled to the packet switching modules to update the plurality of packet flow tables, wherein the control module includes a memory to store a plurality of computer executable commands and a processor. The packet transmission method includes the steps outlined below. A flow entry corresponding to a target packet switching module of the plurality of packet switching modules is generated. A residual memory amount of the memory unit of the target packet switching module is determined to be lower than a threshold value. A redirection packet switching module is selected from the other packet switching modules, wherein the residual memory amount of the memory unit of the redirection packet switching module is not lower than the threshold value. A redirection flow entry is added to the packet flow tables in the target packet switching module and a processing flow entry is added to the packet flow tables in the redirection packet switching module according to the flow entry. The packet is redirected to the redirection packet switching module by the target packet switching module according to the redirection flow entry when the target packet switching module receives a packet corresponding to the redirection flow entry. The packet is processed according to the processing flow entry by the redirection packet switching module.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
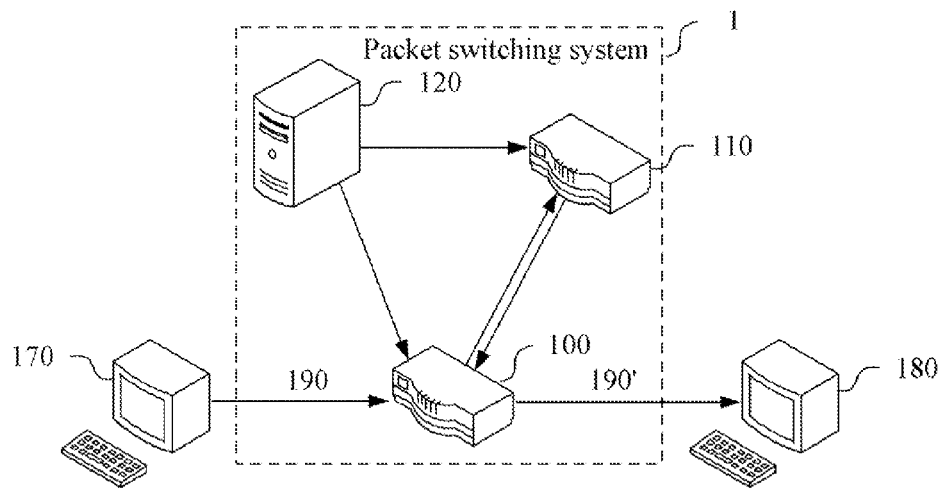
FIG. 1A is a diagram of a packet transmission system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
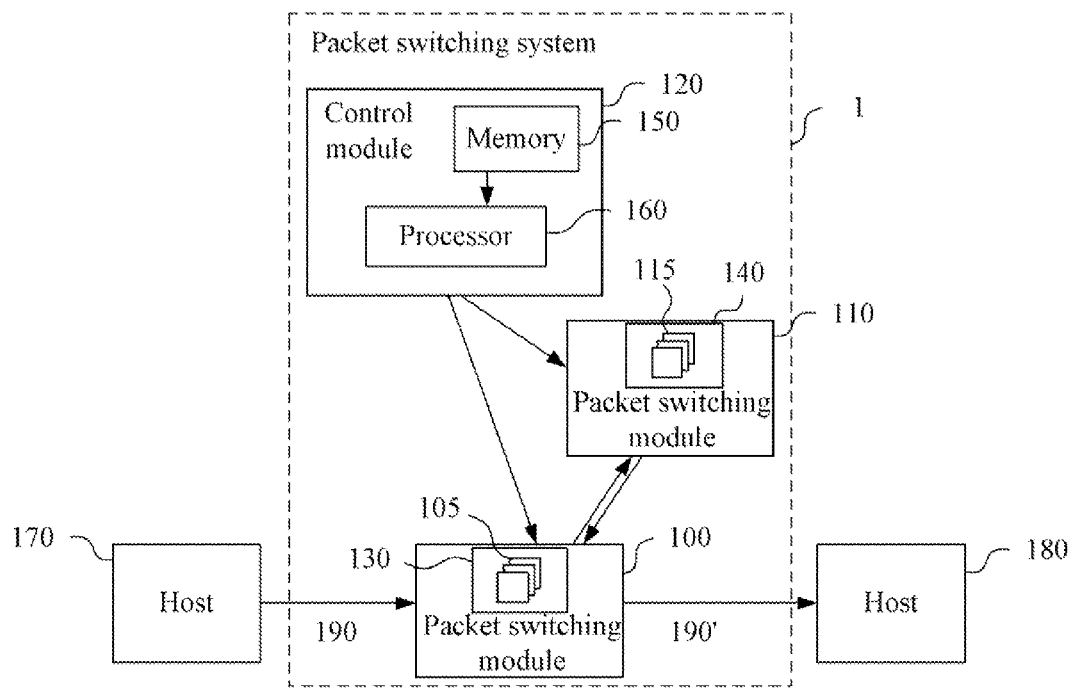
FIG. 1B is a block diagram of the packet transmission system illustrated in FIG. 1A in an embodiment of the present invention.

FIG. 1A is a diagram of a packet transmission system 1 in an embodiment of the present invention. FIG. 1B is a block diagram of the packet transmission system 1 illustrated in FIG. 1A in an embodiment of the present invention. The packet transmission system 1 includes a packet switching module 100, a packet switching module 110 and a control module 120.

In an embodiment, each of the packet switching module 100 and the packet switching module 110 is an OpenFlow packet switching module. It is noted that the number of the packet switching modules illustrated in FIG. 1A and FIG. 1B is for illustrative purpose. In other embodiments, the number of the packet switching modules can be modified according to practical conditions.

In an embodiment, the packet switching modules 100 and 110 respectively include a memory unit 130 and a memory unit 140, in which the memory unit 130 stores packet flow tables 105 and the memory unit 140 stores packet flow tables 115. In an embodiment, each of the memory units 130 and 140 is a ternary content addressable memory (TCAM). The packet flow tables 105 and 115 are TCAM tables. It is noted that TCAM defines three states including 0, 1 and don't care. In other embodiments, the memory units 130 and 140 can be implemented by other memory modules to store the packet flow tables 105 and 115 in other formats.

In an embodiment, the packet flow tables 105 and 115 include a plurality of flow entries. Each of the flow entries can include such as, but not limited to at least one matching criteria, at least one packet content processing action and at least one forwarding action.

The matching criteria includes at least one piece of internal packet information and at least one piece of external packet information. For example, the internal packet information may include, but is not limited to including, an Internet Protocol (IP) address, an Internet Protocol type (IP type), a virtual local area network (VLAN) identifier, a class of service (CoS), a differentiated services code point (DSCP), even the information of whether a packet header is included, the contents of a flow header, or a combination thereof.

The external packet information may include, but is not limited to including, a packet source, a port number of the input port, or a combination thereof. However, the external packet information in the present invention is not limited to such information. Other common network settings and information, such as an Ether type, a source media access control (Src MAC) address, a source IP (Src IP), a destination IP (Dst IP), a L4 source port, or a L4 destination port may be included in the criteria for comparison.

Accordingly, when a packet 190 matches the matching criteria in one of the flow entry, the packet switching module 100 or the packet switching module 110 can process the packet 190 according to the packet content processing action in the flow entry according to the packet flow tables 105 or the packet flow tables 115. As illustrated in FIG. 1A, the packet 190 may be transmitted from such as, but not limited to a host 170. After the processing, the packet 190 may be transmitted to such as, but not limited to a host 180.

In other embodiments, the packet switching module 100 or the packet switching module 110 can receive the packets from other packet switching modules and send the packets to other packet switching modules.

Figure 2:
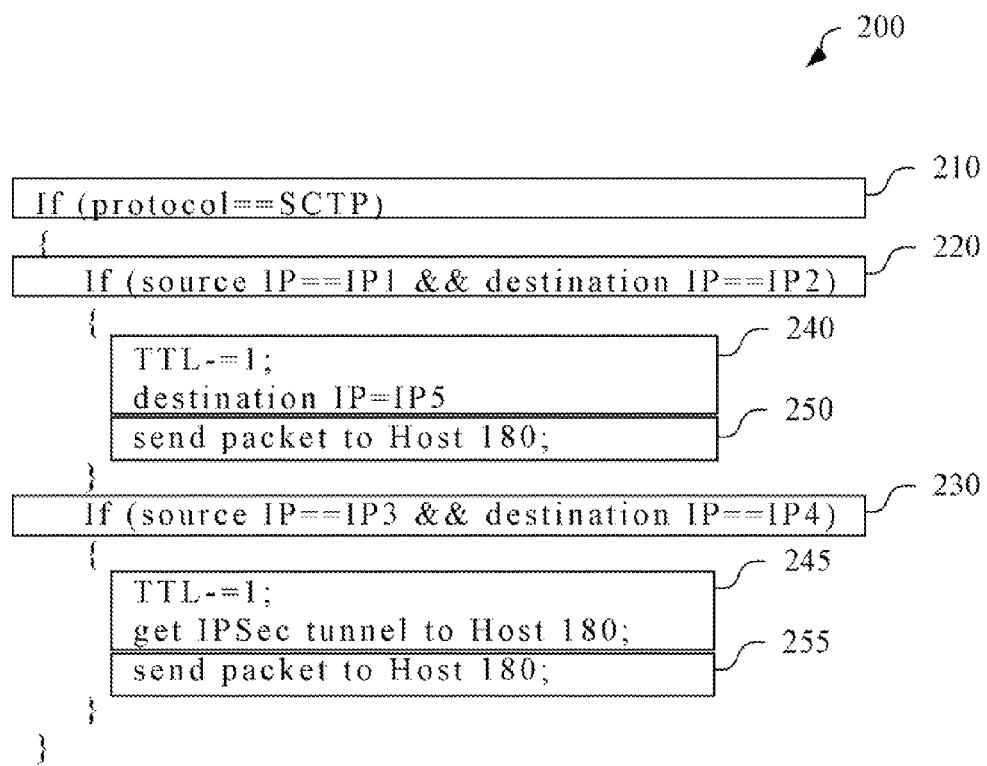
FIG. 2 is an exemplary diagram of a pseudo code of the flow entry in an embodiment of the present invention.

FIG. 2 is an exemplary diagram of a pseudo code of the flow entry 200 in an embodiment of the present invention. In the present embodiment, the flow entry includes the matching criteria 210, 220 and 230, the packet content processing actions 240 and 245 and the forwarding actions 250 and 255.

Take the packet switching module 100 as an example, the packet switching module 100 determines that whether the received packet matches the matching criteria according to the flow entry 200. The flow entry 200 may include such as, but not limited to the matching criteria 210 related to the stream control transmission protocol (SCTP) and the matching criteria 220 and 230 related to the network address.

After determining that the packet matches the matching criteria, the packet switching module 100 further adjusts the content of the packet according to the packet content processing actions 240 and 245. The packet switching module 100 further transmits the packet to such as, but not limited to the host 180 illustrated in FIG. 2 according to the forwarding actions 250 and 255.

Reference is now made to FIG. 1A and FIG. 18B again. The control module 120 is coupled to the packet switching modules 100 and 110 to update the packet flow tables 105 and 115. In different embodiments, the control module 120 can be any device that is equipped with a network communication interface and supports OpenFlow protocol. The simplest example is a personal computer (PC) or a network server. However, the control module 120 in the present invention is not limited such devices.

The control module 120 includes a memory 150 to store a plurality of computer executable commands and a processor 160. The processor 160 executes the commands to provide the function of the packet switching system 1. The operations of the processor 160 are discussed in the following paragraphs.

Figure 3A:
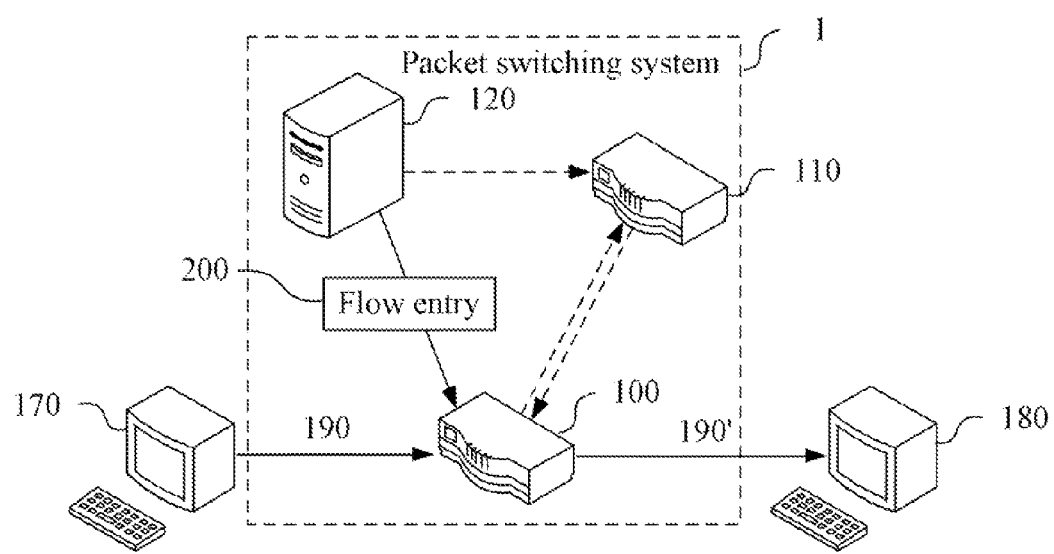
FIG. 3A and FIG. 3B are diagrams of the packet switching system under operation in an embodiment of the present invention.
Figure 3B:
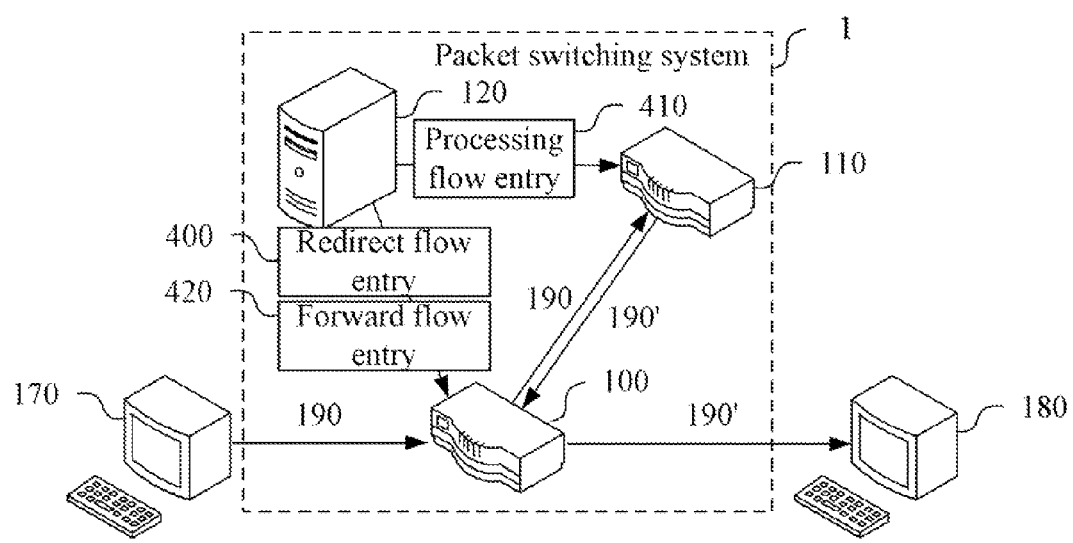

FIG. 3A and FIG. 3B are diagrams of the packet switching system 1 under operation in an embodiment of the present invention. For illustration, operations of the packet switching system 1 are described together with the elements illustrated in FIG. 1B.

The processor 160 generates a flow entry, e.g. the flow entry 200 illustrated in FIG. 2, corresponding to a target packet switching module of the packet switching modules 100 and 110. In the present embodiment, when the user wants to adjust the procedures of packet transmitting and packet processing of the packet switching system 1, the user sends the command through an operating interface (not illustrated) to the processor 160 in the control module 120 to generate the flow entry 200. In the present embodiment, the target packet switching module that the flow entry 200 corresponds is the packet switching module 100.

The processor 160 further determines that whether a residual memory amount of the memory unit 130 of the packet switching module 100 is lower than a threshold value. When the residual memory amount of the memory unit 130 is not lower than the threshold value, the processor 160 directly adds the flow entry 200 to the packet flow tables 105 stored in the memory unit 130 of the packet switching module 100, as illustrated in FIG. 3A.

Under such a condition, when the packet switching module 100 receives the packet 190 and determines that the packet 190 matches the matching criteria in the flow entry 200, the packet switching module 100 directly processes the packet according to the processing actions. The packet switching module 100 further transmits the packet 190' having the amended content to the host 180. For example, when the packet 190 matches the matching criteria 210 and 220, the packet switching module 100 amends the packet 190 according to the packet content processing action 240 and forwards the packet 190' to the host 180 according to the forwarding action 250. When the packet 190 matches the matching criteria 210 and 230, the packet switching module 100 amends the packet 190 according to the packet content processing action 245 and forwards the packet 190' to the host 180 according to the forwarding action 255.

On the other hand, when the processor 160 determines that the residual memory amount of the memory unit 130 is lower than the threshold value, the processor 160 selects a redirection packet switching module, such as the packet switching module 110. In an embodiment, the residual memory amount of the memory unit in the redirection packet switching module should be not lower than the threshold value. In an embodiment, the processor 160 selects the packet switching module that has the largest residual memory amount as the redirection packet switching module.

According to the flow entry 200, the processor 160 adds a redirection flow entry 400 and a forwarding flow entry 420 to the packet flow tables 105 in the packet switching module 100 and adds a processing flow entry 410 to the packet flow tables 115 in the packet switching module 110.

Figure 4A:
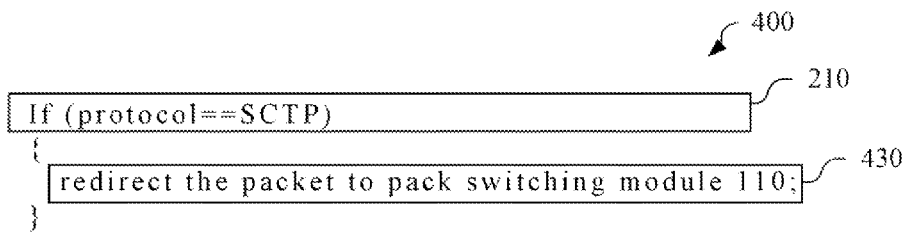
FIG. 4A is an exemplary diagram of a pseudo code of the redirection flow entry in an embodiment of the present invention.
Figure 4B:
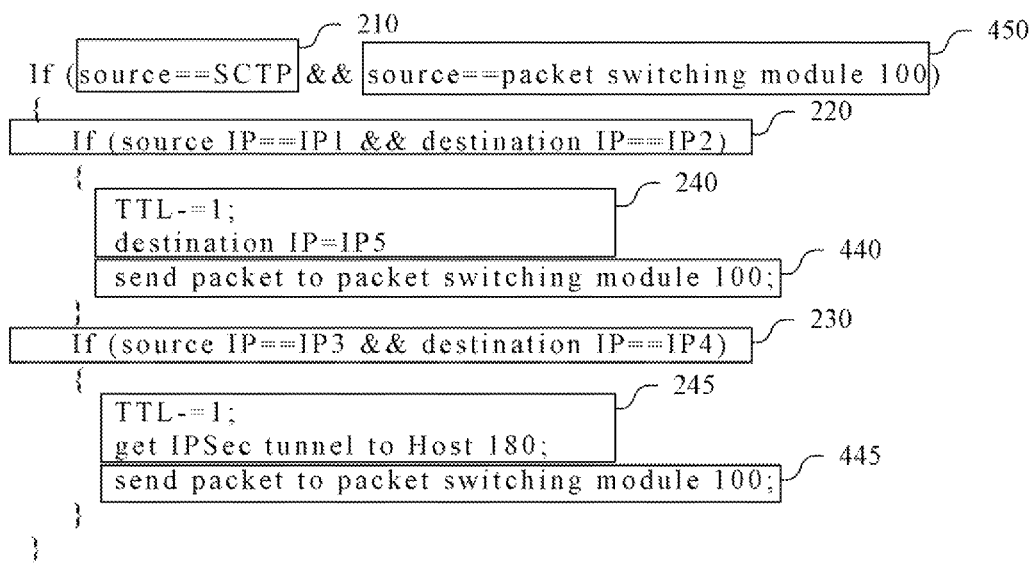
FIG. 4B is an exemplary diagram of a pseudo code of the processing flow entry in an embodiment of the present invention.
Figure 4C:
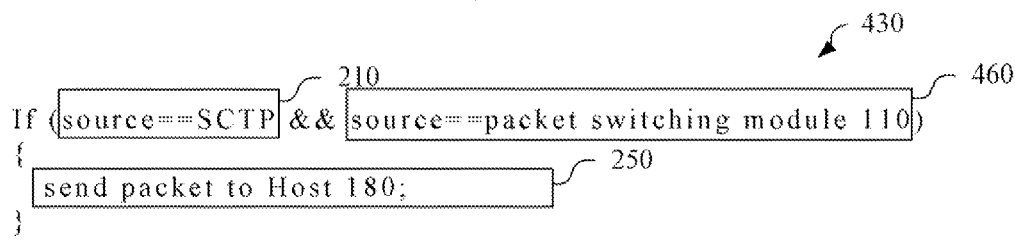
FIG. 4C is an exemplary diagram of a pseudo code of the forwarding flow entry in an embodiment of the present invention.

FIG. 4A is an exemplary diagram of a pseudo code of the redirection flow entry 400 in an embodiment of the present invention. FIG. 4B is an exemplary diagram of a pseudo code of the processing flow entry 410 in an embodiment of the present invention. FIG. 4C is an exemplary diagram of a pseudo code of the forwarding flow entry 420 in an embodiment of the present invention.

The adjustment of the packet flow tables 105 and 115 made by the processor 160 and the operations on the packet 190 performed by the packet switching modules 100 and 110 are discussed in the following paragraphs together with the elements illustrated in FIG. 3B.

Take the flow entry 200 described above as an example, the redirection flow entry 400 includes the matching criteria 210 of the flow entry 200 and the redirection action 430. Consequently, the packet switching module 100 redirects the packet 190 to the packet switching module 110 after the packet 190 that matches the matching criteria 210 is received. It is noted that, though the flow entry 200 includes the matching criteria 210, 220 and 230, the packet 190 is redirected even only the matching criteria 210 is matched. In other embodiments, the redirection flow entry 400 can be established such that the redirection action is performed when both the matching criteria 210 and 220 are matched or when both the matching criteria 210 and 230 are matched.

The processing flow entry 410 includes the matching criteria 210, 220 and 230 of the original flow entry 200, the packet content processing actions 240 and 245 of the original flow entry 200 and packet returning actions 440 and 445. In an embodiment, the processing flow entry 410 may selectively include other matching criteria, such as the matching criteria 450 illustrated in FIG. 4B to make sure that the packet 190 is redirected from the packet switching module 100.

Accordingly, when the packet switching module 110 receives the packet 190 and determines that the packet 190 matches the matching criteria, the packet switching module 110 processes the packet 190 according to the actions, such as the packet content processing actions 240 and 245. Subsequently, the packet switching module 110 returns the packet 190 to the packet switching module 100 according to the packet returning actions 440 and 445.

The forwarding flow entry 420 includes the matching criteria 210 and the forwarding action 250 of the original flow entry 200. In an embodiment, the forwarding flow entry 420 may selectively include other matching criteria, such as the matching criteria 460 illustrated in FIG. 4C to make sure that the packet 190 is returned from the packet switching module 110. It is noted that, since the forwarding actions 250 and 255 of the original flow entry 200 are the same in the present embodiment, only one forwarding action 250 is presented in the forwarding flow entry 420. In other embodiments, when different packet content processing actions correspond to different forwarding actions, other matching criteria can be added such that the packet switching module 100 can make the determination to perform different forwarding actions.

Consequently, when the residual memory amount of the memory unit 130 of the packet switching module 100 is not enough, the packet switching system 1 can dynamically adjust the packet flow tables 105 and 115 in the packet switching modules 100 and 110 through the control module 120. The processing actions that contain lots of data are stored in the packet flow tables 115. The packet switching module 100 only performs the redirection action such that the packet switching module 110 actually performs the processing on the contents of the packet. The overflow condition of the packet switching module 100 generated due to the small residual memory amount of the memory unit can be avoided.

Figure 5:
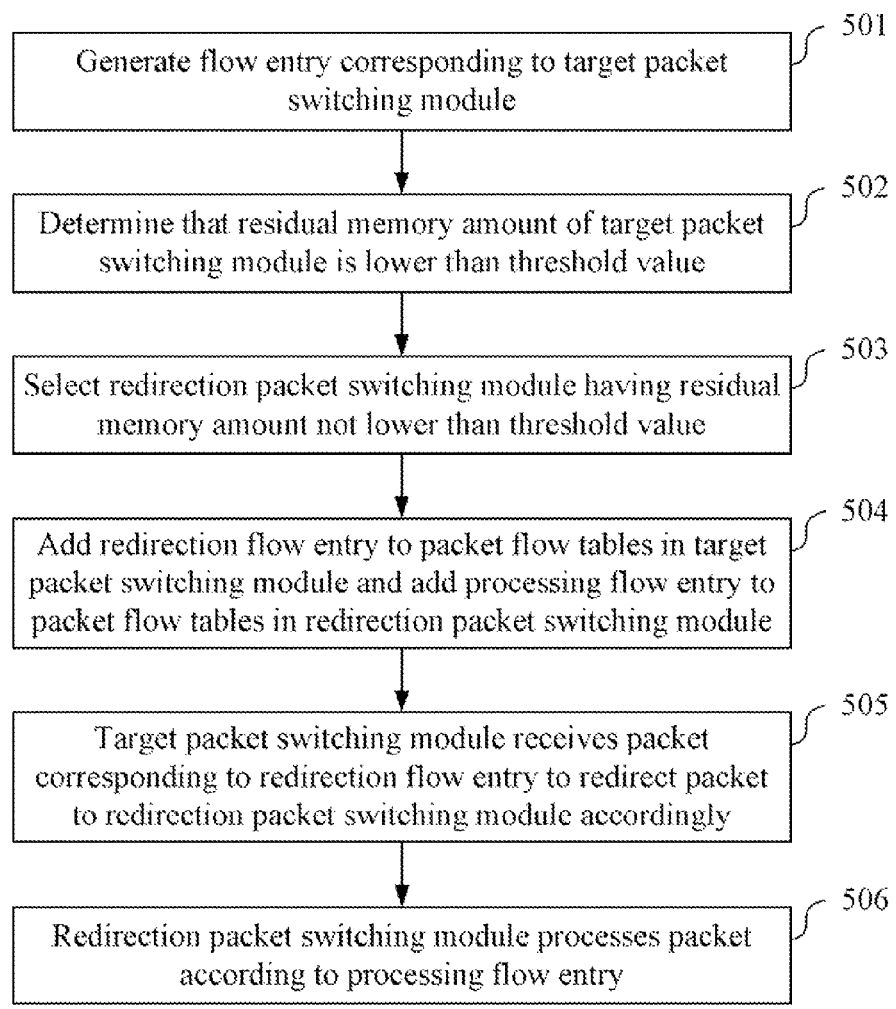
FIG. 5 is a flow chart of a packet switching method in an embodiment of the present invention.

FIG. 5 is a flow chart of a packet switching method 500 in an embodiment of the present invention. The packet switching method 500 is used in the packet switching system 1 illustrated in FIG. 1A and FIG. 1B. More specifically, the packet switching method 500 is implemented by using a computer program to control the modules in the packet switching system 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The packet switching method 500 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In operation 501, the processor 160 generates a flow entry corresponding to a target packet switching module. In the present embodiment, the target packet switching module is the packet switching module 100.

In operation 502, the processor 160 determines that a residual memory amount of the memory unit 130 of the target packet switching module (the packet switching module 100) to be lower than a threshold value.

In operation 503, the processor 160 selects a redirection packet switching module, wherein the residual memory amount of the memory unit of the redirection packet switching module is not lower than the threshold value. In the present embodiment, the redirection packet switching module is the packet switching module 110.

In operation 504, the processor 160 adds a redirection flow entry 400 to the packet flow tables 105 in the target packet switching module (the packet switching module 100) and adds a processing flow entry 410 to the packet flow tables 115 in the redirection packet switching module (the packet switching module 100) according to the flow entry 200.

In operation 505, the packet 190 is redirected to the redirection packet switching module (the packet switching module 110) by the target packet switching module (the packet switching module 100) according to the redirection flow entry 400 when the packet 190 corresponding to the redirection flow entry 400 is received.

In operation 506, the packet 190 is processed according to the processing flow entry 410 by the redirection packet switching module (the packet switching module 110).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A packet transmission system comprising:
a plurality of packet switching modules each having a memory unit to store a plurality of packet flow tables; and
a control module coupled to the packet switching modules to update the plurality of packet flow tables, wherein the control module comprises a memory to store a plurality of computer executable commands and a processor, and the processor executes the commands to perform operations of:
generating a flow entry corresponding to a target packet switching module of the plurality of packet switching modules;
selecting one of the packet switching modules as a redirection packet switching module from the packet switching modules other than the target packet switching module when a residual memory amount of the memory unit of the target packet switching module is lower than a threshold value, wherein the residual memory amount of the memory unit of the redirection packet switching module is not lower than the threshold value; and
adding a redirection flow entry to the packet flow tables in the target packet switching module and adding a processing flow entry to the packet flow tables in the redirection packet switching module according to the flow entry;
wherein when the target packet switching module receives a packet corresponding to the redirection flow entry, the target packet switching module redirects the packet to the redirection packet switching module according to the redirection flow entry such that the redirection packet switching module processes the packet according to the processing flow entry.

2. The packet transmission system of claim 1, wherein the flow entry comprises at least one matching criteria and at least one packet content processing action, the redirection flow entry comprises at least part of the matching criteria and a redirection action and the processing flow entry comprises the matching criteria and the packet content processing action.

3. The packet transmission system of claim 2, wherein the target packet switching module determines that the packet matches at least part of the matching criteria to redirect the packet to the packet to the redirection packet switching module according to the redirection action, and the redirection packet switching module determines that the packet matches the matching criteria to process the packet according to the packet content processing action.

4. The packet transmission system of claim 2, wherein the processing flow entry further comprises a packet returning action, and the redirection packet switching module further returns the packet to the target packet switching module according to the packet returning action.

5. The packet transmission system of claim 4, wherein the flow entry further comprises a forwarding action, and the processor adds a forwarding flow entry that comprises at least part of the matching criteria and the forwarding action such that the target packet switching module determines that the packet matches at least part of the matching criteria to forward the packet according to the forwarding action after the packet is returned from the redirection packet switching module.

6. The packet transmission system of claim 5, wherein the target packet switching module forwards the packet to a destination packet switching module or a destination host according to the forwarding flow entry.

7. The packet transmission system of claim 1, wherein each of the plurality of packet switching modules is a OpenFlow packet switching module.

8. The packet transmission system of claim 1, wherein the memory unit is a ternary content addressable memory (TCAM).

9. The packet transmission system of claim 1, wherein when the processor determines that the residual memory amount of the memory unit of the target packet switching module is not lower than the threshold value, the processor directly adds the flow entry to the packet flow tables in the target packet switching module, and the target packet switching module processes the packet according to the flow entry when the target packet switching module receives the packet corresponding to the flow entry.

10. A packet transmission method used in a packet transmission system comprising a plurality of packet switching module and a processing module, wherein each of the packet switching modules has a memory unit to store a plurality of packet flow tables, and the control module is coupled to the packet switching modules to update the plurality of packet flow tables, wherein the control module comprises a memory to store a plurality of computer executable commands and a processor, the packet transmission method comprises:

generating a flow entry corresponding to a target packet switching module of the plurality of packet switching modules by the processor;

determining that a residual memory amount of the memory unit of the target packet switching module is lower than a threshold value by the processor;

selecting one of the packet switching modules as a redirection packet switching module from the packet switching modules other than the target packet switching module when a residual memory amount of the memory unit of the target packet switching module is lower than a threshold value, wherein the residual memory amount of the memory unit of the redirection packet switching module is not lower than the threshold value by the processor;

adding a redirection flow entry to the packet flow tables in the target packet switching module and adding a processing flow entry to the packet flow tables in the redirection packet switching module according to the flow entry by the processor;

redirecting the packet to the redirection packet switching module by the target packet switching module according to the redirection flow entry when the target packet switching module receives a packet corresponding to the redirection flow entry; and processing the packet according to the processing flow entry by the redirection packet switching module.

11. The packet transmission method of claim 10, wherein the flow entry comprises at least one matching criteria and at least one packet content processing action, the redirection flow entry comprises at least part of the matching criteria and a redirection action and the processing flow entry comprises the matching criteria and the packet content processing action.

12. The packet transmission method of claim 11, further comprising:

determining that the packet matches at least part of the matching criteria by the target packet switching module to redirect the packet to the packet to the redirection packet switching module according to the redirection action; and determining that the packet matches the matching criteria by the redirection packet switching module to process the packet according to the packet content processing action.

13. The packet transmission method of claim 11, wherein the processing flow entry further comprises a packet returning action, and the packet transmission method further comprises:

returning the packet to the target packet switching module according to the packet returning action by the redirection packet switching module.

14. The packet transmission method of claim 13, wherein the flow entry further comprises a forwarding action, and the packet transmission method further comprises:

adding a forwarding flow entry that comprises at least part of the matching criteria and the forwarding action by the processor;

determining that the packet matches at least part of the matching criteria by the target packet switching module to forward the packet according to the forwarding action after the packet is returned from the redirection packet switching module.

15. The packet transmission method of claim 14, wherein the target packet switching module forwards the packet to a destination packet switching module or a destination host according to the forwarding flow entry.

16. The packet transmission method of claim 10, wherein each of the plurality of packet switching modules is a Open-Flow packet switching module.

17. The packet transmission method of claim 10, wherein the memory unit is a ternary content addressable memory (TCAM).

18. The packet transmission method of claim 10, further comprising:

adding the flow entry directly to the packet flow tables in the target packet switching module by the processor when the processor determines that the residual memory amount of the memory unit of the target packet switching module is not lower than the threshold value; and processing the packet according to the flow entry by the target packet switching module when the target packet switching module receives the packet corresponding to the flow entry.

19. A non-transitory computer readable storage medium to store a computer program to execute a packet transmission method used in a packet transmission system comprising a plurality of packet switching module and a processing module, wherein each of the packet switching modules has a memory unit to store a plurality of packet flow tables, and the control module is coupled to the packet switching modules to update the plurality of packet flow tables, wherein the control module comprises a memory to store a plurality of computer executable commands and a processor, the packet transmission method comprises:

generating a flow entry corresponding to a target packet switching module of the plurality of packet switching modules by the processor;

determining that a residual memory amount of the memory unit of the target packet switching module is lower than a threshold value by the processor;

selecting one of the packet switching modules as a redirection packet switching module from the packet switching modules other than the target packet switching module when a residual memory amount of the memory unit of the target packet switching module is lower than a threshold value, wherein the residual memory amount of the memory unit of the redirection packet switching module is not lower than the threshold value by the processor;

adding a redirection flow entry to the packet flow tables in the target packet switching module and adding a processing flow entry to the packet flow tables in the redirection packet switching module according to the flow entry by the processor;

redirecting the packet to the redirection packet switching module by the target packet switching module according to the redirection flow entry when the target packet switching module receives a packet corresponding to the redirection flow entry; and processing the packet according to the processing flow entry by the redirection packet switching module.

* * * * *